US 8,165,984 B2

(12) United States Patent
Kiersky

(10) Patent No.: US 8,165,984 B2
(45) Date of Patent: Apr. 24, 2012

(54) DECISION SERVICE FOR APPLICATIONS

(75) Inventor: Eric Kiersky, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 937 days.

(21) Appl. No.: 12/057,499

(22) Filed: Mar. 28, 2008

(65) Prior Publication Data

US 2009/0248603 A1    Oct. 1, 2009

(51) Int. Cl.
*G06F 17/00* (2006.01)
*G06N 5/02* (2006.01)
(52) U.S. Cl. .......................................... 706/48
(58) Field of Classification Search .................. None
See application file for complete search history.

(56) References Cited

U.S. PATENT DOCUMENTS

| | | | |
|---|---|---|---|
| 6,466,942 B1 * | 10/2002 | Tolkin | 1/1 |
| 6,535,855 B1 | 3/2003 | Cahill et al. | |
| 6,870,816 B1 | 3/2005 | Edwards et al. | |
| 7,191,163 B2 | 3/2007 | Herrera et al. | |
| 2002/0087696 A1 | 7/2002 | Byrnes | |
| 2004/0034848 A1 | 2/2004 | Moore et al. | |
| 2004/0236846 A1 | 11/2004 | Alvarez et al. | |
| 2005/0027862 A1 | 2/2005 | Nguyen et al. | |
| 2007/0005547 A1 | 1/2007 | Nochta et al. | |
| 2007/0260646 A1 | 11/2007 | Szlam | |
| 2009/0313216 A1 * | 12/2009 | Berry et al. | 707/3 |

OTHER PUBLICATIONS

Knuth, Donald E.; "The Art of Computer Programming"; 1973; Addison-Wesley; vol. 3; pp. 389-396.*
Colomb et al.; "Very Fast Decision Table Execution of Propositional Expert Systems"; 1990; AAAI-90 Proceedings; pp. 671-676.*
Vanthienen et al.; "Illustration of a Decision Table Tool for Specifying and Implementing Knowledge Based Systems"; 1993; Proceedings of the 1993 IEEE Int.'l Conf. on Tools with AI; pp. 198-205.*
Wets, Geert; "Decision Tables in Knowledge-Based Systems: Adding Knowledge . . . "; 1998; Technische Universiteit Eindhoven; pp. I-XII, 51-54, 77-80, and 133-140.*
Idiom Software Ltd., "Decision-centric Rules Modelling", Dated: May 30, 2005, pp. 1-5.
Lumina Decision Systems, Inc., "Analytica Decision Engine for Windows",Tutorial Release 3.1, Dated: Nov. 2004, 24 Pages.

* cited by examiner

*Primary Examiner* — Alan Chen
*Assistant Examiner* — Stanley K Hill

(57) ABSTRACT

A decision service is described that provides a decision making process for an application. The decision service includes a runtime interface, a resolver interface, and an inference engine. The runtime interface is configured to receive a request from an application to generate a decision. The resolver interface is configured to invoke one or more fact resolver modules to determine corresponding fact values. The inference engine is configured to communicate with the resolver interface to determine a plurality of fact values, and to compare the determined plurality of fact values to one or more rows of a decision table to determine a matched row. The decision provided by the decision service is a conclusion corresponding with the matched row of the decision table.

17 Claims, 9 Drawing Sheets

100

200

300

| | node 602a | node 602b | node 602c | node 602d | node 602e | conclusions |
|---|---|---|---|---|---|---|
| 816a | true | true | null | true | null | conclusion 606a |
| 816b | true | true | null | false | true | conclusion 606b |
| 816c | true | true | null | false | false | conclusion 606c |
| 816d | true | false | null | null | null | conclusion 606d |
| 816e | false | null | true | null | null | conclusion 606e |
| 816f | false | null | false | null | null | conclusion 606f |

DECISION SERVICE FOR APPLICATIONS

BACKGROUND

Many types of applications exist that run on computer systems. System software and application software are two types of computer-based applications. System software manages and controls computer hardware so that application software can perform tasks. Examples of system software include operating systems and device drivers. Application software applies the capabilities of computer systems to tasks. Examples of application software include media players, word processors, and spreadsheets.

Some applications incorporate complex logic that handles many conditions and exceptions. For example, an application or group of applications may manage a cluster of servers that host a website. Such applications may include complex logic to manage the serving of content requested from the websites, to perform the pushing of software updates to user computers, to handle error conditions, and/or to perform other functions for the websites. In some cases, application complexity has grown large enough to make the applications challenging to maintain.

The growing complexity of applications has led to the inclusion of computer code in applications that is difficult to read, to understand, to modify, and to enhance. Such applications may be difficult to fully test due to many variables and conditional outcomes. Furthermore, this complexity has resulted in processing that is hard to audit for correctness. For example, when evaluating application performance, it may difficult to determine why a particular function was performed, to determine what is supposed to happen when a particular combination of events occur, and to determine further logical outcomes of processing performed by the application. Ways of reducing the complexity of applications are desired so that the resulting problems may be reduced or eliminated entirely.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A decision service is described herein that is configured to perform a decision making process. The decision service may enable a reduction in the complexity of the design and/or construction of an application, by performing one or more decision making processes for the application. In some example aspects, the decision service may be configured to perform one or more functions for an application, to test one or more functions of an application, and/or to otherwise assist with and/or take over decision making processes related to an application.

In accordance with one implementation, a decision service includes a runtime interface, a resolver interface, and an inference engine. The runtime interface is configured to receive a request from an application to generate a decision. The resolver interface is configured to invoke one or more fact resolver modules to determine corresponding fact values for the inference engine. The inference engine is configured to determine a plurality of fact values, to communicate with the resolver interface to determine at least one fact value of the plurality of fact values, and to compare the determined plurality of fact values to one or more rows of a decision table to determine a matched row. The decision table includes columns that list required fact values for the determined plurality of fact values. Each row of the decision table has a corresponding conclusion. The inference engine is configured to set a decision to the conclusion corresponding with the matched row of the decision table. The runtime interface is configured to transmit the decision to the requesting application.

The decision service may further include a configuration interface. The configuration interface enables a user to configure a decision tree having a plurality of nodes and branches, to model a decision making process. The configuration interface is configured to generate the decision table from the decision tree such that each column of the decision table corresponds to a node of the decision tree. Furthermore, the configuration interface may be configured to enable the user to provide the fact resolver modules to the decision service.

The decision service may further include a client assembly generator. The client assembly generator is configured to generate a client assembly that performs a decision making process in a stand-alone configuration. For instance, the client assembly generator may generate the client assembly to include a copy of the inference engine, of the resolver interface, of the runtime interface, of the decision table, and of the fact resolver modules.

Methods for performing a decision making process are also described. In one method, a request is received from an application to generate a decision. A plurality of fact values is determined in response to the request. The determined plurality of fact values is compared to one or more rows of a decision table to determine a matched row. The decision is set to a conclusion corresponding to the matched row of the decision table. The decision is transmitted to the requesting application.

In one implementation, fact values may be determined and compared to rows of the decision table on a column-by-column basis.

For example, a comparison may be performed in a column-by-column basis as follows. A first row of the decision table may be set to a current row. A first column of the decision table may be set to a current column. Whether a first determined fact value matches the required fact value in the current column and current row of the decision table is determined. If the determined fact value does not match the required fact value in the current column and current row, a next row of the decision table is set to the current row and the matching is repeated. If the determined fact value does match the required fact value in the current column and current row, whether a next column is present in the decision table is determined. If a next column is not present in the decision table, the comparison is complete and the conclusion corresponding to the current row is selected. If a next column is present in the decision table, the next column of the decision table is set to the current column. Whether a non-null fact value is required for the current column is determined. If a fact value is required for the current column, a fact value corresponding to the current column is determined and the matching is repeated using this determined fact value. If a fact value is not required for the current column, the determination is repeated of whether a next column is present in the decision table.

A computer program product is also described herein that enables performance of decision making processes.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
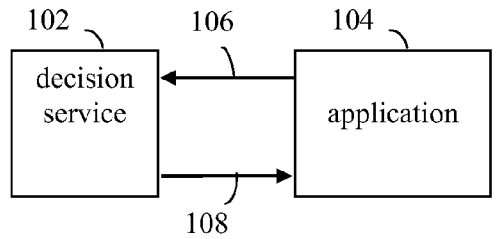
FIGS. 1-3 show block diagrams of decision service systems, according to example embodiments of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Example Decision Service Embodiments

Embodiments of a decision service are described herein. The decision service enables a reduction in the complexity of the design and/or construction of applications. A user may configure the decision service to perform one or more decision making processes for an application. In an embodiment, the user provides a decision sequence in the form of a decision tree that includes nodes and branches. The decision tree represents a flow of the decision making process. The user further provides one or more fact resolvers for making decisions at nodes of the decision tree. The decision service converts the decision tree into the form of a decision table, and uses the decision table and fact resolvers to perform a decision making process.

FIG. 1 shows a decision service system 100, according to an example embodiment. As shown in FIG. 1, system 100 includes a decision service 102 and an application 104. Decision service 102 is configured to perform one or more decision making processes related to application 104. For example, decision service 102 may be configured to perform one or more functions for application 104, to test one or more functions of application 104, and/or to otherwise assist with and/or take over decision making processes for application 104.

Application 104 may communicate with decision service 102 to cause decision service 102 to perform one or more decision making processes for application 104 by transmitting a first communication signal 106 to decision service 102. First communication signal 106 may include one or more signals configured to set up and initiate the functionality of decision service 102. First communication signal 106 may optionally include values for one or more variables to be used by decision service 102 when performing its functions.

In response, decision service 102 may communicate with application 102 by transmitting a second communication signal 108 to application 104. Second communication signal 108 may include one or more decision results generated by decision service 102. Second communication signal 108 may further optionally include one or more intermediate decision results and/or variable values.

Application 104 may be any type of application, such as system software or application software. For example, in a system software embodiment, application 104 may be an operating system, a component of an operating system, a control system, a device driver, a web service, a website server, or any other application that controls computer hardware and/or software, and/or performs other system task. In an application software embodiment, application 104 may be a media player, a word processor, a spreadsheet, or any other type of computer application.

Decision service 102 may be configured to perform a decision making process for any type of application 104, including performing a decision making process related to system software or application software. Example decision making processes for decision service 102 include performing decision making processes for an operating system (e.g., processor load balancing, network load balancing), for a device driver, for a web service, for a website server (e.g., managing software update/patch delivery bandwidth), for a media player application, for a word processor application, for a spreadsheet application, and for any other type of application. Decision service 102 may be configured to perform diagnostic determinations, to implement a "wizard"-style user interface, to implement online questionnaires, to perform control system functions, etc. Decision service 102 may be implemented in hardware, software, firmware, or any combination thereof. For example, in an embodiment, decision service 102 may be implemented as computer code that is executed by one or more processors in one or more computer systems.

Figure 2:
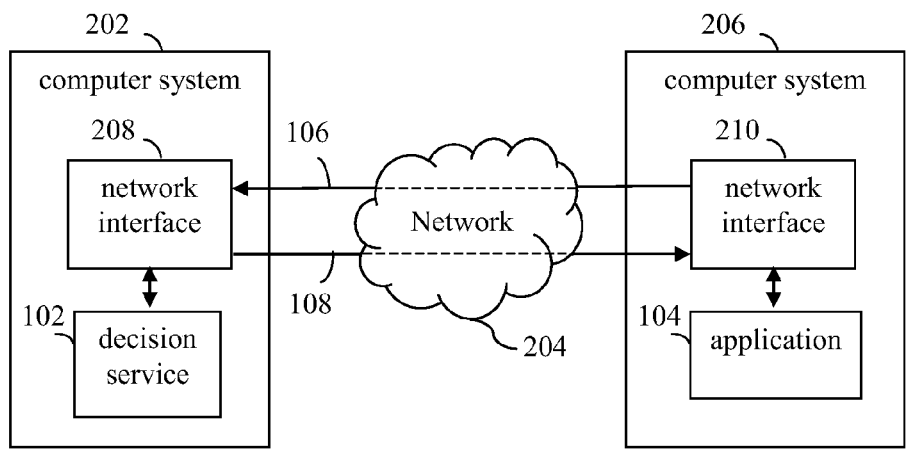

Decision service 102 and application 104 may communicate with each other in a variety of ways. For example, FIG. 2 shows a decision service system 200 that is an example embodiment of system 100 shown in FIG. 1. In the embodiment of FIG. 2, decision service 102 and application 104 communicate with each other through a network. As shown in FIG. 2, system 200 includes a first computer system 202, a network 204, and a second computer system 206. First computer system 202 includes a network interface 208 and decision service 102. Second computer system 206 includes a network interface 210 and application 104.

Decision service 102 is coupled to network interface 208 in computer system 202, and application 104 is coupled to network interface 210 in computer system 206. Network interface 208 enables decision service 102 to communicate over network 204, and network interface 210 enables application 104 to communicate over network 204. For example, network interface 210 may transmit first communication signal 106 through network 204 for application 104. Network interface 208 receives first communication signal 106, and provides information contained in first communication signal 106 to decision service 102. Network interface 208 transmits second communication signal 108 through network 204 for decision service 102. Network interface 210 receives second communication signal 108, and provides information contained in second communication signal 108 to application 104.

Each of computer systems 202 and 206 may be any type of computer system, including being a server, a personal computer, a mobile computer, etc. Examples of computer systems 202 and 206 are further described elsewhere herein. Network 204 may include any type of network, such as a local area network (LAN) or a wide area network (WAN), or a combination networks, such as the Internet. Network interfaces 208 and 210 may be any type of network interface, including an Ethernet network card (e.g., a network interface controller/card (NIC)), a wireless network interface (e.g., an 802.11 wireless LAN card), etc.

Figure 3:
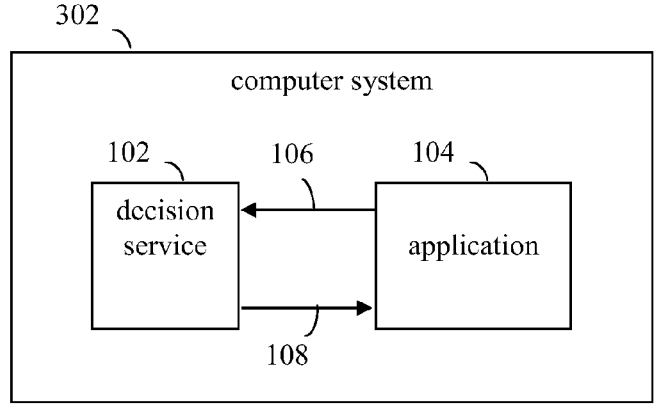

FIG. 3 shows a decision service system 300 that is another example embodiment of system 100 shown in FIG. 1. In FIG. 3, decision service 102 and application 104 are both included in a computer system 302. In the embodiment of FIG. 3, decision service 102 and application 104 communicate with each other using communication mechanism(s) internal to computer system 302. Examples of computer system 302 are further described elsewhere herein.

Figure 4:
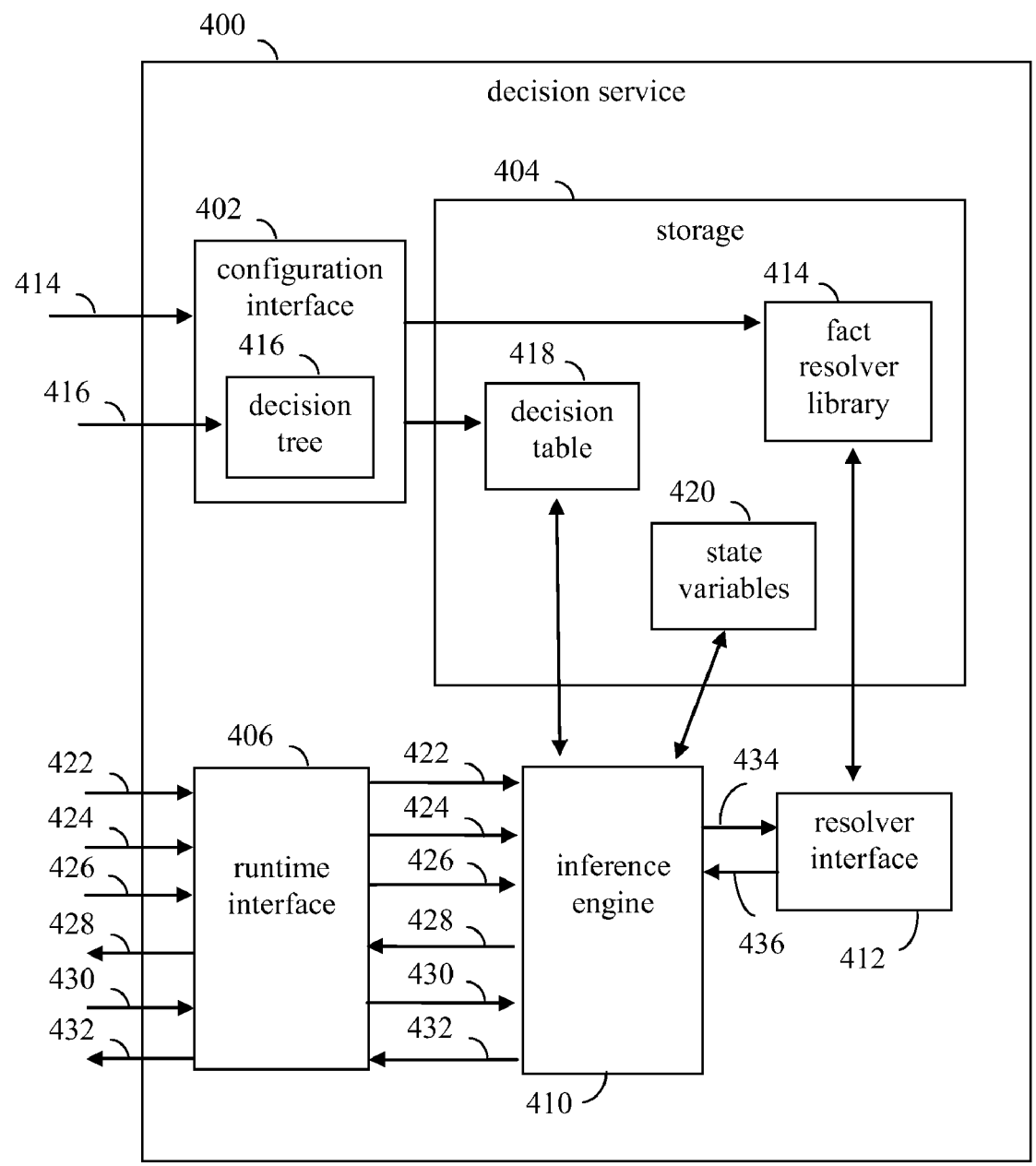
FIG. 4 shows a block diagram of a decision service, according to an example embodiment of the present invention.

Decision service 104 may be configured in a variety of ways to perform its functions. For instance, FIG. 4 shows a block diagram of a decision service 400, according to an example embodiment. Decision service 400 is an example of decision service 104 shown in FIG. 1. As shown in FIG. 4, decision service 400 includes a configuration interface 402, storage 404, a runtime interface 406, an inference engine 410, and a resolver interface 412. These elements of decision service 104 are described in detail in the following subsections.

Configuration Interface

Configuration interface 402 is an interface that enables users to configure decision service 400 to perform decision making processes for applications (such as application 104 shown in FIG. 1). For example, in an embodiment, configuration interface 402 may enable a user to configure a decision making process in the form of a decision tree. By enabling a user to configure a decision making process as a decision tree, configuration interface 402 provides an intuitive design interface, as decision trees are well known.

Figure 5:
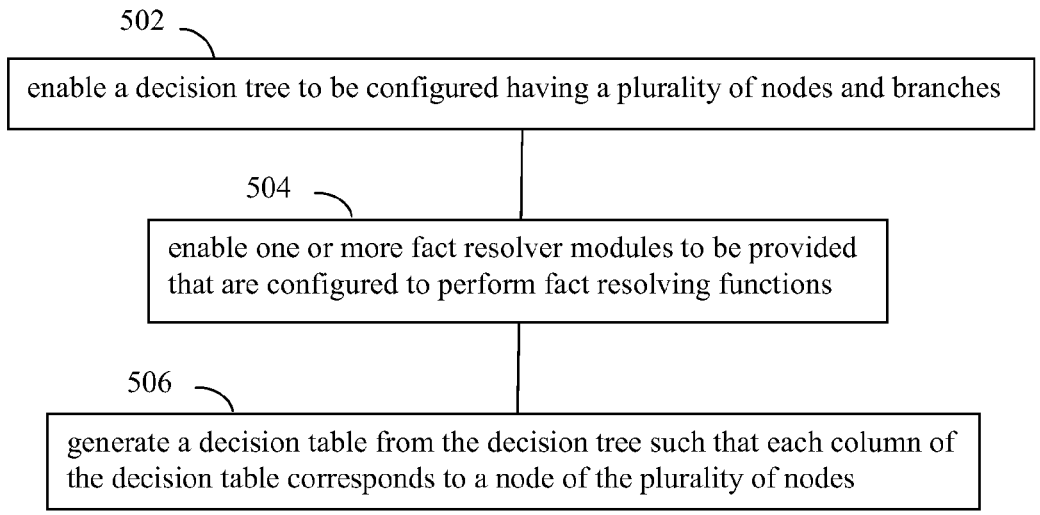
FIG. 5 shows a flowchart for configuring a decision service to perform a decision making process, according to an example embodiment of the present invention.

FIG. 5 shows a flowchart 500 for configuring a decision service to perform a decision making process, according to an example embodiment. For instance, in an embodiment, configuration interface 402 may perform flowchart 500. The steps of flowchart 500 do not necessarily need to be performed in the order shown in FIG. 5. Flowchart 500 is described as follows.

In step 502, a decision tree is enabled to be configured that has a plurality of nodes and branches. For example, in an embodiment, configuration interface 402 enables a user to configure a decision tree 416 to model a decision making process to be performed for application 104. Configuration interface 402 may include a user interface, such as a graphical user interface (GUI), which provides tree modeler capability. The user interface may enable the user to view, create, and/or modify decision tree 416, in order to configure decision processing. Configuration interface 402 may be implemented in hardware, software, firmware, or any combination thereof, to enable a user to configure a decision tree. For example, configuration interface 402 may provide a Web-based application, a website, or other network interface, or an application such as a Microsoft Windows® desktop application that enables the user to configure decision tree 416.

Figure 6:
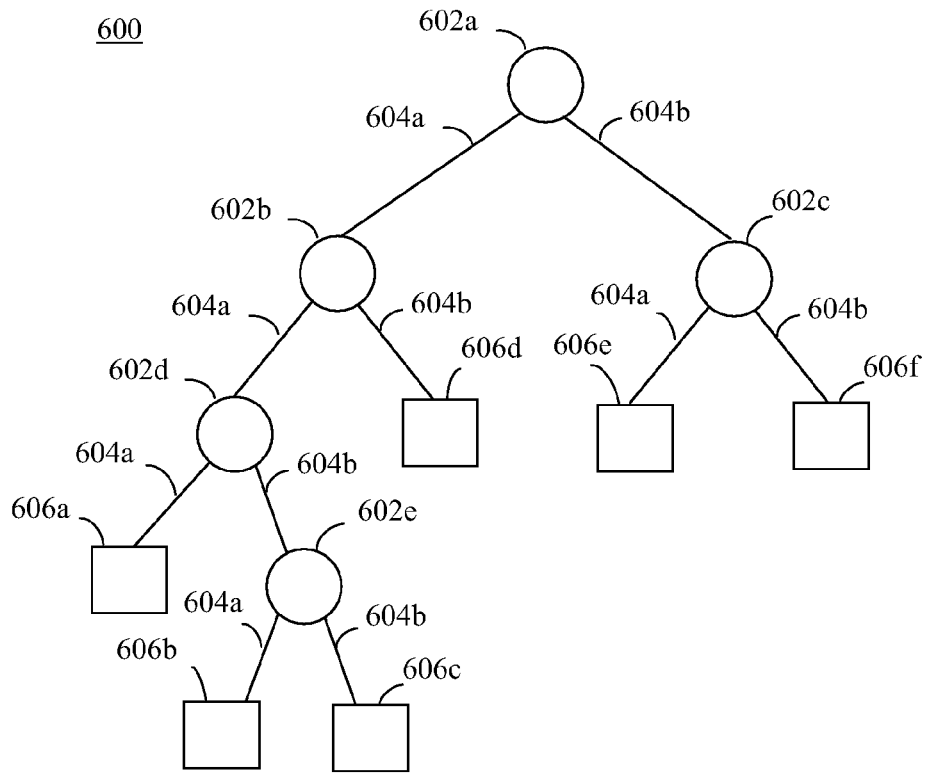
FIG. 6 shows an example decision tree, according to an embodiment of the present invention.

Decision tree 416 may be represented as a hierarchical diagram by interface 402. For instance, FIG. 6 shows an example embodiment of a decision tree 600. In FIG. 6, decision tree 600 is shown including first-fifth decision nodes 602a-602e. Decision tree 600 may include any number of decision nodes 602 in embodiments. Each decision node 602 of decision tree 600 represents a fact to be determined if the particular node 602 is reached. Decision nodes 602 are interconnected by radiating branches in decision tree 600, which terminate at conclusions 606. For instance, in the example of FIG. 6, first-sixth conclusions 606a-606f are present. Decision tree 600 may include any number of conclusions 606, in embodiments. Conclusions 606 are the results of the decision making process provided by decision tree 600. A single conclusion 606 is reached in decision tree 600 during a particular decision making process, and a value of the reached conclusion 606 is returned as a decision making result. A first path 604a and a second path 604b both project from each decision node 602. The first and second paths 604a and 604b each project to a respective next decision node 602 or to a conclusion 606.

The configuration of decision tree 600 shown in FIG. 6 is described as follows, for illustrative purposes. In the example of FIG. 6, decision node 602a is a root decision node, at which a decision making process related to decision tree 600 begins. With regard to first decision node 602, first path 604a projects to second decision node 602b and second path 604b projects to third decision node 602c. With regard to second decision node 602b, first path 604a projects to fourth decision node 602d and second path 604b projects to conclusion 606d. With regard to third decision node 602c, first path 604a projects to conclusion 606e and second path 604b projects to conclusion 606f. With regard to fourth decision node 602d, first path 604a projects to conclusion 606a and second path 604b projects to fifth decision node 602e. With regard to fifth decision node 602e, first path 604a projects to conclusion 606b and second path 604b projects to conclusion 606c.

In embodiments, decision tree 416 may be configured using configuration interface 402 to model many types of decision making processes. Configurations for decision tree 416 to model a particular decision making process will be known to persons skilled in the relevant art(s).

In step 504, one or more fact resolver modules configured to perform fact resolving functions are enabled to be provided. For example, in an embodiment, configuration interface 402 enables the user to load a fact resolver library 414. Fact resolver library 414 includes one or more fact resolvers modules that are configured to perform decisions at decision nodes 602 of the decision tree configured in step 502. Whether first path 604a or second path 604b is chosen from a particular decision node 602 in decision tree 600 depends on the fact resolution performed by a fact resolver module corresponding to the decision node 602. Fact resolver library 414 is stored in storage 404.

Figures 7, 8:
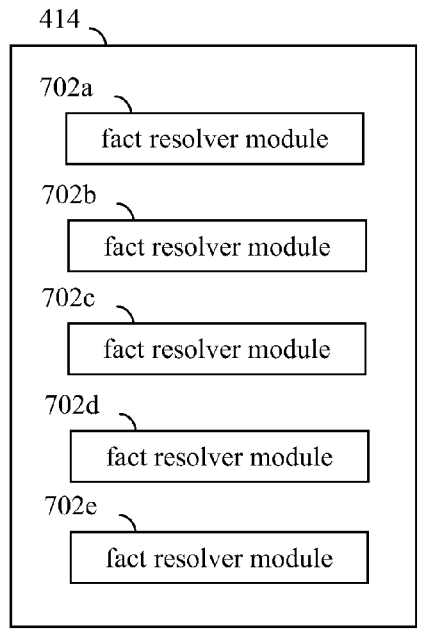
FIG. 7 shows a block diagram of an example fact resolver library, according to an embodiment of the present invention.
FIG. 8 shows an example decision table, according to an embodiment of the present invention.

FIG. 7 shows a block diagram of an example embodiment of fact resolver library 414. As shown in FIG. 7, fact resolver library 414 includes first-fifth fact resolver modules 702a-702e. Any number of fact resolver modules 702 may be provided by a user and included in fact resolver library 414. Fact resolver modules 702a-702e may be included in a single file or in separate files. For example, in an embodiment, fact resolver library 414 may be provided by a user as a dynamic link library (DLL) file that contains fact resolver modules 702a-702e. Fact resolver modules 702a-702e may be implemented as computer programs/routines/methods, including being implemented in a computer language such as C++, C#, Java, JavaScript, or other language.

At each decision node 602 in decision tree 600, a decision is made which determines whether the corresponding first or second path 604a or 604b is traversed from the decision node 602. The decision is made by resolving a fact corresponding to the decision node 602. The value of the fact may already be known, or the fact value may be determined by accessing a fact resolver module 702 that corresponds to the decision node 602. In an embodiment, fact resolver module 702 may resolve a fact value for a decision node 602 as being true or false, or the fact value may remain unknown/null. Branch 604a is traversed from the decision node 602 in decision tree 600 if the fact is resolved as being true. Branch 604b is traversed from the decision node 602 in decision tree 600 if the fact is resolved as being false.

Note that in further embodiments, a fact resolver module 702 may be capable of resolving a fact value having values other than true or false, including having a numerical value, a string value, etc. In such an embodiment, branches 604 may be traversed based on the resulting numerical value, string value, etc. Furthermore, any number of branches 604 may project from a decision node 602, depending on the number of possible resulting numerical values, string values, etc. for the resolved fact value.

Referring back to FIG. 5, in step 506, a decision table is generated from the decision tree such that each column of the decision table corresponds to a node of the plurality of nodes. For example, as shown in FIG. 4, decision table 418 may be generated by configuration interface 402 from decision tree 416. FIG. 8 shows an example embodiment of a decision table 800 generated from decision tree 600 shown in FIG. 6. In the example of FIG. 8, decision table 800 has five columns 812a-812e, conclusions 814, and six rows 816a-816e. Although represented in FIG. 8 in table form, decision table 800 may be stored in storage 404 in any suitable data structure configuration. Configuration interface 402 generates decision table 800 such that each column 812 corresponds to a node of decision tree 600, and each row 816 corresponds to a distinct complete path through decision tree 800 (from the source node) that leads to a conclusion. A decision table may have any number of columns 812 and rows 816, depending on a number of nodes 602 and conclusions 606 present in the corresponding decision tree.

For instance, in FIG. 8, decision table 800 has five columns 812a-812e corresponding to the five decision nodes 602a-602e of decision tree 600. Each of columns 812a-812e lists required fact values (e.g., true or false) or a null value for a resolution of the fact of the corresponding one of decision node 602a-602e. Each of rows 816a-816f of decision table 800 corresponds to a respective one of conclusions 606a-606f of decision tree 600. For instance, as shown in FIG. 8, with regard to row 816a of decision table 800, if the fact with regard to node 602a is resolved to be true, the fact with regard to node 602b is resolved to be true, the fact with regard to node 602d is resolved to be true, then conclusion 606a is reached. Likewise, with regard to row 816d of decision table 800, if the fact with regard to node 602a is resolved to be false, the fact with regard to node 602c is resolved to be true, then conclusion 606e is reached.

Runtime Interface, Inference Engine, and Resolver Interface

Referring back to FIG. 4, decision table 418 and fact resolver library 414 are referenced by inference engine 410 to make a decision. Inference engine 410 uses decision table 418 as a representation of the decision making process provided by a user as decision tree 418. Decision table 418 may be easier to be processed by inference engine 410 relative to decision tree 416, and thus decision table 418 is generated by configuration interface 402 to be processed by inference engine 410. However, in an alternative embodiment, inference engine 410 may use decision tree 416 to control the decision making process.

Figure 9:
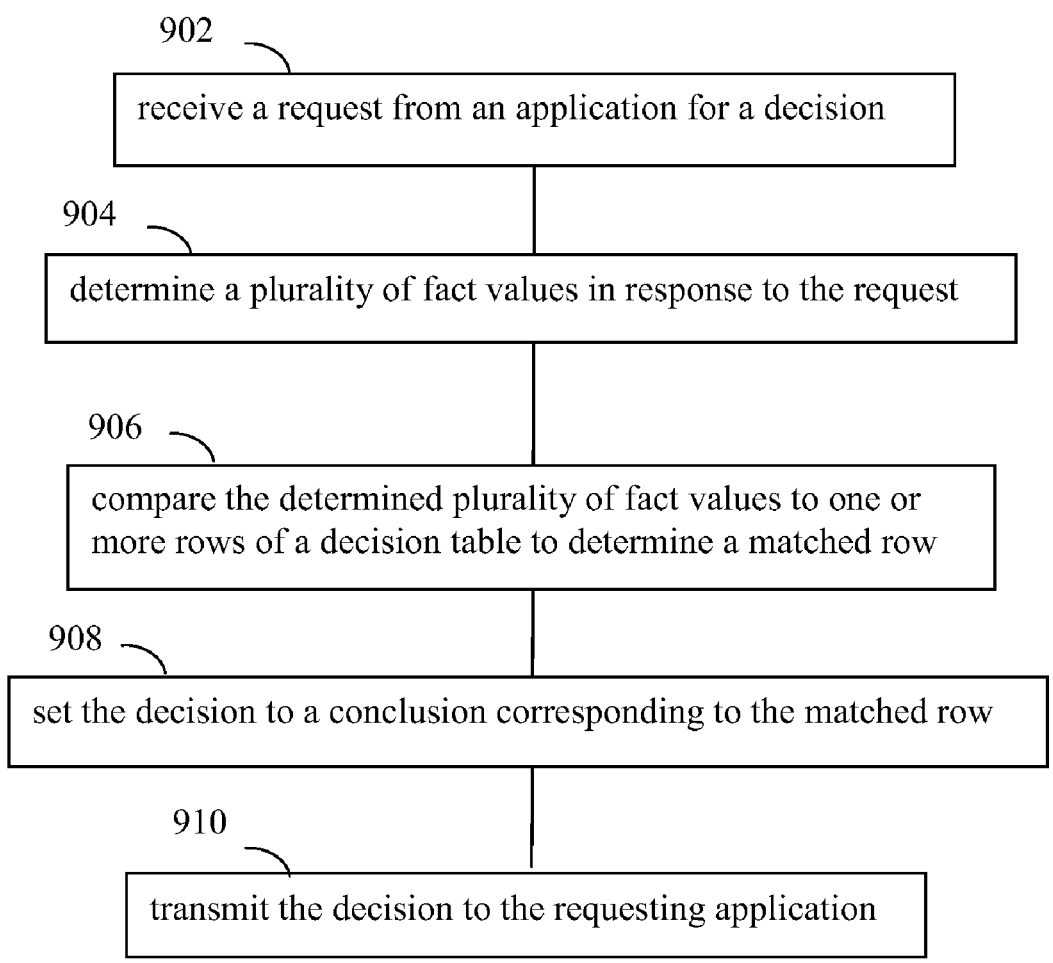
FIG. 9 shows a flowchart for making a decision using a decision service, according to an example embodiment of the present invention.

FIG. 9 shows a flowchart 900 for making a decision, according to an example embodiment. Flowchart 900 may be performed by runtime interface 406, inference engine 410, and resolver interface 412 shown in FIG. 4. Further structural and operational embodiments will be apparent to persons skilled in the relevant art(s) based on the discussion regarding flowchart 900. Flowchart 900 is described as follows.

Flowchart 900 begins with step 902. In step 902, a request is received from an application for a decision. For example, in an embodiment, application 104 shown in FIG. 1 may communicate with decision service 102 according to first communication signal 106 to request that a decision be made by decision service 102. In an embodiment, runtime interface 406 shown in FIG. 4 may handle communications with application 104 for decision service 102.

In an embodiment, runtime interface 406 is configured to perform bi-directional communications with application 104 for decision service 400. Runtime interface 406 may be implemented in hardware, software, firmware, or any combination thereof. For example, in an embodiment, runtime interface 406 may be configured as an application programming interface (API), such as a Web service (e.g., if decision service 400 is accessed over the Internet). Runtime interface 406 may be configured to enable communications according to any suitable data format or communication protocol. For instance, runtime interface 406 may enable an SQL (structured query language) connection, according to standard SQL, a T-SQL (Transact-SQL) extension, or other SQL language. In another embodiment, runtime interface 406 may enable HTTP (hypertext transfer protocol) communications, including .NET HTTP communications and/or XML (extensible markup language) HTTP communications. In still another embodiment, runtime interface 406 may enable ADO.NET components to be used for communications.

FIG. 4 illustrates an example of communications between runtime interface 406 and application 104. As shown in FIG. 4, runtime interface 406 may receive an initialization signal 422 from application 104. Initialization signal 422 is configured to initialize a new decision making process to be performed by inference engine 410. Runtime interface 406 transmits initialization signal 422 to inference engine 410. In response, inference engine 410 is initialized in preparation to perform a new decision making process. Inference engine 410 may initialize one or more state variable 420 in storage 404. State variables 420 may be stored, modified, and/or accessed by inference engine 410 and/or fact resolver modules 702 during fact value determinations.

Furthermore, runtime interface 406 may receive data values from application 104 to be used during the decision making process performed by decision service 102. For example as shown in FIG. 4, runtime interface 406 may receive a set data values signal 424 from application 104. Runtime interface 406 may transmit set data values signal 424 to inference engine 420, which may store data values received in signal 424 in storage 404 as state variables 420. Furthermore, runtime interface 406 may receive a get data values signal 426 from application 104. Get data values signal 426 may include a request for values of one or more of state variables 420. Runtime interface 406 may transmit get data values signal 426 to inference engine 420. Inference engine 420 may access state variables 420 in storage 404 for the data values, and may transmit the data values to runtime interface in a retrieved data values signal 428. Runtime interface 406 may transmit retrieved data values signal 428 to application 104 to provide the requested data values.

Furthermore, as shown in FIG. 4, runtime interface 406 may receive a decision request signal 430 from application 104. Runtime interface 406 transmits decision request signal 430 to inference engine 410. Decision request signal 430 causes inference engine 410 to perform a decision making process.

Referring back to flowchart 900 in FIG. 9, in step 904, a plurality of fact values is determined in response to the request. In an embodiment, inference engine 410 determines a plurality of fact values in response to receiving decision request signal 430. The determined plurality of fact values are used in the decision making process to determine a decision to be transmitted to application 104. The decision making process performed by inference engine 410 is controlled by decision table 418 in storage 404. Inference engine 410 accesses decision table 418 to determine which fact values need to be determined, and a sequence for determining the fact values. For instance, referring to decision table 800 shown in FIG. 8, each column 812 corresponds to a fact value that may need to be determined to generate a decision.

In an embodiment, inference engine 410 may determine a fact value for a particular column 812 based on fact values already known to inference engine 410, and thus may directly determine the fact value. In another embodiment, inference engine 410 may determine a fact value for a particular column 812 by communicating with resolver interface 412. Resolver interface 412 may be configured to invoke fact resolver modules 702 (FIG. 7) of fact resolver library 414 to determine fact values, which may be returned to inference engine 410.

Figure 10:
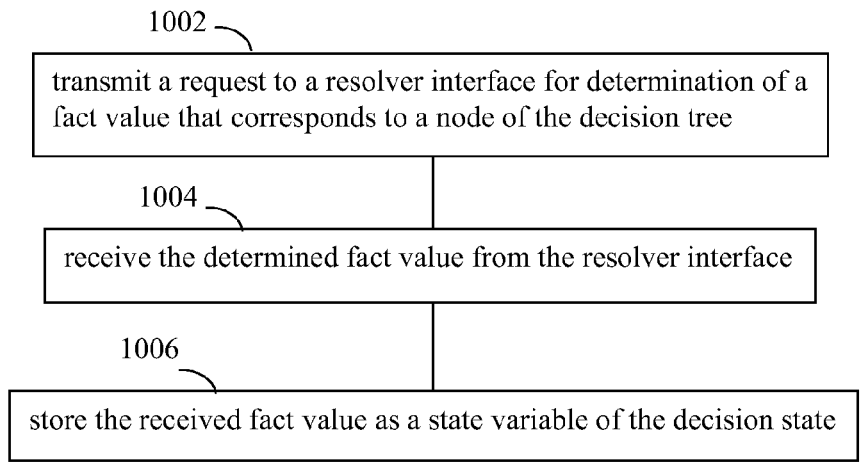
FIG. 10 shows a flowchart for determining a fact value, according to an example embodiment.

For instance, FIG. 10 shows a flowchart 1000 for determining a fact value, according to an example embodiment. For instance, flowchart 1000 may be performed by inference engine 410 and resolver interface 412 shown in FIG. 4. Further structural and operational embodiments will be apparent to persons skilled in the relevant art(s) based on the discussion regarding flowchart 1000. Flowchart 1000 is described as follows.

Flowchart 1000 begins with step 1002. In step 1002, a request is transmitted to a resolver interface for determination of a fact value that corresponds to a node of the decision tree. For example, as shown in FIG. 4, inference engine 410 may transmit a fact value determination request 434 to resolver interface 412. The fact value determination request 434 may be a request to determine a fact value corresponding to a particular column of decision table 418.

In step 1004, the determined fact value is received from the resolver interface. In an embodiment, resolver interface 412 interacts with a fact resolver module 702 of fact resolver library 414 configured to determine the fact value. For example, resolver interface 412 may receive a name of the fact resolver module 702 configured to determine the fact value in signal 434 (in step 1002), and may invoke the named fact resolver module 702 in fact resolver library 414. Resolver interface 412 receives the determined fact value from the fact resolver module 702, and transmits the determined fact value to inference engine 410 in fact value determination response 436.

In step 1006, the received fact value is stored as a state variable of the decision state. In embodiments, inference engine 410 and/or the fact resolver module 702 may store the determined fact value in state variables 420 in storage 404.

Figure 11:
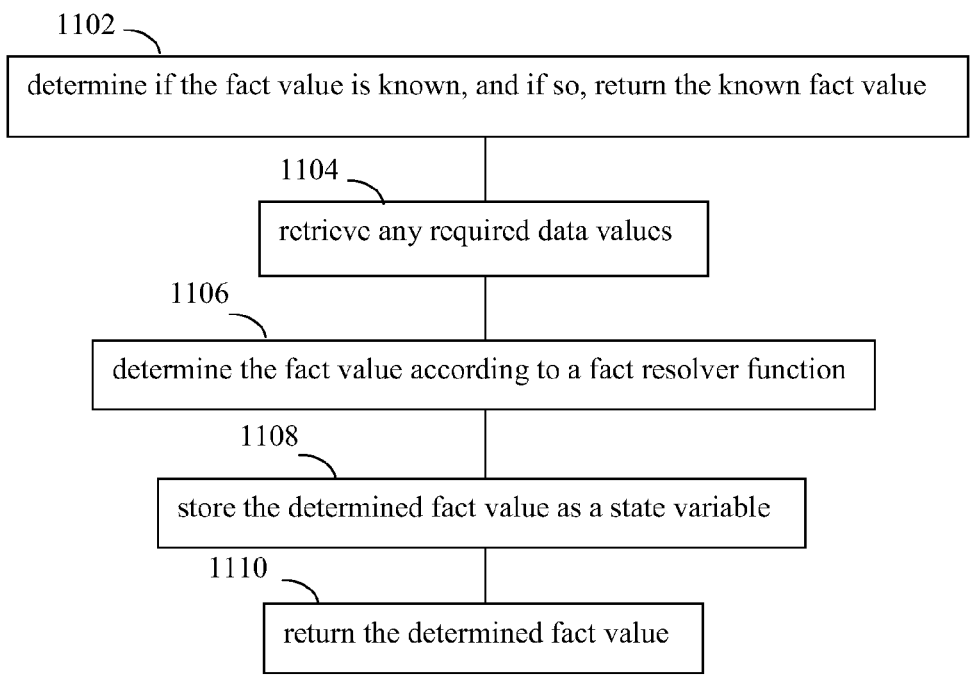
FIG. 11 shows a flowchart for a fact resolver module to resolve a fact value, according to an example embodiment.

A fact resolver module 702 may be configured to resolve a fact value in a variety of ways. For instance, FIG. 11 shows a flowchart 1100 for resolving a fact value, according to an example embodiment. Flowchart 1100 may be performed by a fact resolver module 702, in an embodiment. Further structural and operational embodiments will be apparent to persons skilled in the relevant art(s) based on the discussion regarding flowchart 1100. Flowchart 1100 is described as follows.

Flowchart 1100 begins with step 1102. In step 1102, whether the fact value is known is determined, and if so, the known fact value is returned. In embodiments, if fact resolver module 702b determines that the fact value has already been determined, such as by fact resolver module 702a, the already-determined fact value may be transmitted by fact resolver module 702b to resolver interface 412. For instance, the fact value may have already been determined, and stored in state variables 420.

In step 1104, any required data values are retrieved. In an embodiment, a fact resolver module 702a may require data to perform its fact resolving function. Such data may be retrieved from state variables 420 by fact resolver module 702a. Examples of such data include data received from application 104 in set data values signal 424 and interim data values stored by other fact resolver modules 702 or by inference engine 410. In another embodiment, a fact resolver module 702 may be configured to access data stored in a database or a file located externally to decision service 400, to access data at a Web service, and/or to access data from other external sources.

In step 1106, the fact value is determined according to a fact resolver function. In an embodiment, a fact resolver module 702 may be configured to determine a fact value by performing any number of calculations, comparisons, and/or any further type of operation (e.g., arithmetic, string, binary, etc.).

In step 1108, the determined fact value is stored as a state variable. In an embodiment, a fact resolver module 702 may generate true or false values, and may further generate numerical values, string values, and/or other types of data, which may be stored in state variables 420.

In step 1110, the determined fact value is returned. In an embodiment, a fact resolver module 702 returns a true or false value as the determined fact value to resolver interface 412. Resolver interface 412 transmits the determined fact value to inference engine 410. In an embodiment, when a fact resolver module 702 is unable to determine a fact value, a null may be returned.

Resolver interface 412 may be implemented in hardware, software, firmware, or any combination thereof. For example, in an embodiment, resolver interface 412 may be implemented as computer code that is executed by one or more processors in one or more computer systems. In an embodiment, resolver interface 412 provides an interface between fact resolver library 414 and inference engine 410, enabling inference engine 410 to make relatively simple calls for fact values (e.g., by name or label, such as by particular node 602 or column 812).

Referring back to flowchart 900 in FIG. 9, in step 906, the determined plurality of fact values is compared to one or more rows of a decision table to determine a matched row. In an embodiment, step 906 is performed by inference engine 410. Inference engine 410 may be configured to compare the plurality of fact values determined in step 904 with the contents of the rows of decision table 418 to determine a decision. Referring to FIG. 8, a decision table may include a plurality of columns 812 that each list required fact values, such as "true" or "false" (or "null" if a fact value is not determined), for a corresponding determined fact value determined in step 904. In an embodiment, inference engine 410 may be configured to compare the fact values determined in step 904 with the required fact values in the rows of decision table 418 to determine a matched row.

The comparison performed by inference engine 410 in step 906 may be performed in a variety of ways, including by a "backward-chaining" process, such as by comparing the determined plurality of data values with an entire row of decision table 418 at one time, or by a "forward-chaining" process, such as by comparing determined data values with the contents of a single column in decision table 418 at a time. For instance, inference engine 410 may be configured to process decision table 418 from top to bottom, left to right, comparing fact values for each column. When all assessed fact values match in a decision table row, that row becomes a conclusion.

Figure 12:
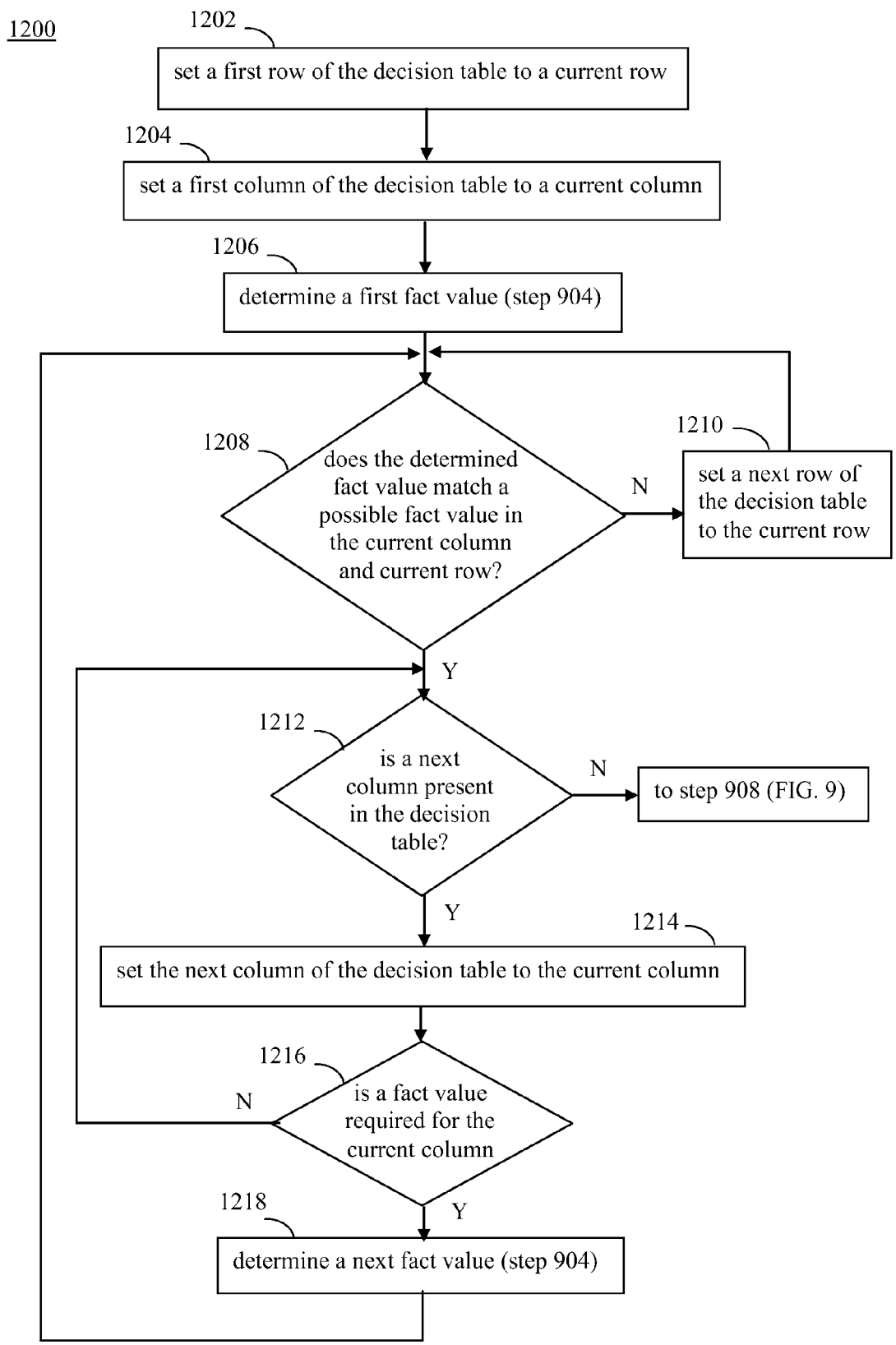
FIG. 12 shows a flowchart for processing a decision table, according to an example embodiment.

For example, FIG. 12 shows a flowchart 1200 for processing a decision table, according to an example embodiment. According to flowchart 1200, a decision table is processed in a column-by-column basis to determine a matched row. For illustrative purposes, flowchart 1200 is described with respect to decision table 800 shown in FIG. 8. Further structural and operational embodiments will be apparent to persons skilled in the relevant art(s) based on the discussion regarding flowchart 1200. Flowchart 1200 is described as follows.

Flowchart 1200 begins with step 1202. In step 1202, a first row of the decision table is set to a current row. For example, referring to decision table 800 shown in FIG. 8, row 816*a* may be set to the current row. Operation proceeds to step 1204.

In step 1204, a first column of the decision table is set to a current column. In the current example, referring to decision table 800, column 812*a* may be set to the current column. Operation proceeds to step 1206.

In step 1206, a first fact value is determined (step 904). In step 904 described above, a plurality of fact values are determined. Step 1206 includes a determination of a first fact value in step 904. In the current example, the first fact value may be the fact value corresponding to column 812*a*. As described above, a fact resolver module 702 may be used to determine a fact value. For example, fact resolver module 702*a* may correspond to column 812*a*, and may be invoked by resolver interface 412 to determine the fact value corresponding to column 812*a*. In the current example, the fact value corresponding to column 812*a* may be determined to be "true." Operation proceeds to step 1208.

In step 1208, whether the determined fact value matches a required fact value in the current column and current row is determined. If the determined fact value does not match the required fact value in the current column and current row, operation proceeds to step 1210. If the determined fact value matches the required fact value in the current column and current row, operation proceeds to step 1212. For instance, in the current example, the fact value determined in step 1206 for column 812*a* is "true." The determined fact value of "true" matches the required fact value of "true" in current column 812*a* and current row 816*a*. Thus, in the current example, operation proceeds to step 1212.

In step 1210, a next row of the decision table is set to the current row. Operation proceeds from step 1210 back to step 1208.

In step 1212, whether a next column is present in the decision table is determined. If a next column is not present in the decision table, operation proceeds to step 908 of flowchart 900 in FIG. 9 (flowchart 1200 is complete). If a next column is present in the decision table, operation proceeds to step 1214. In the current example, current column 812*a* is not the last column in decision table 800. Thus, a next column is present in decision table 800—column 812*b*—and operation proceeds to step 1214.

In step 1214, the next column of the decision table is set to the current column. In the current example, column 812*b* is the next column after current column 812*a*, and thus is set to the new current column. Operation proceeds to step 1216.

In step 1216, whether a fact value is required for the current column is determined. If a fact value, not including a "null" value, is not listed in the current column and current row, operation proceeds back to step 1212. If a fact value, not including a "null" value, is listed for the current column and current row, operation proceeds to step 1218. In the current example, a required fact values of "true" is listed in current column 812*b* for current row 816*a*. Thus, a fact value is required, and operation proceeds to step 1218.

In step 1218, a next fact value is determined (step 904). Step 1218 includes a determination of a next fact value performed in step 904 described above. In the current example, the next fact value may be the fact value corresponding to column 812*b*. For example, fact resolver module 702*b* may correspond to column 812*b*, and may be invoked by resolver interface 412 to determine the fact value corresponding to column 812*b*. In the current example, the fact value corresponding to column 812*b* may be determined to be "true." Operation proceeds back to step 1208.

The current example is continued as follows with reference to flowchart 1200. In step 1208, the fact value of "true" determined in step 1218 matches the required fact value of "true" in current column 812*b* and current row 816*a*. Thus, operation proceeds to step 1212 from step 1208. In step 1212, a next column—column 812*c*—is determined to be present in decision table 800. Thus, operation proceeds to step 1214 from step 1212. In step 1214, column 812*c* is the next column after the current column 812*b*, and thus is set to the new current column. Operation proceeds to step 1216. In step 1216, a "null" is present in current column 812*c* and current row 816*a*, and thus a fact value is not required. Operation therefore proceeds to step 1212.

In step 1212, a next column—column 812*d*—is determined to be present in decision table 800. Thus, operation proceeds to step 1214 from step 1212. In step 1214, column 812*d* is the next column after the current column 812*c*, and thus is set to the new current column. Operation proceeds to step 1216. In step 1216, a "true" data value is present in current column 812*d* and current row 816*a*, and thus a fact value is required. Operation therefore proceeds to step 1218. In step 1218, the next fact value determined is the fact value corresponding to column 812*d*. Fact resolver module 702*d* may correspond to column 812*d*, and may be invoked by resolver interface 412 to determine the fact value corresponding to column 812*d*. For instance, the fact value corresponding to column 812*d* may be determined to be "false." Operation proceeds back to step 1208.

In step 1208, the determined fact value of "false" does not match the required fact value of "true" in current column 812*d* and current row 816*a*. Thus, operation proceeds to step 1210 from step 1208. In step 1210, the next row of decision table 800 after current row 816*a*—row 816*b*—is set to be the current row. Operation proceeds back to step 1208.

In step 1208, the determined fact value of "false" does match the required fact value of "false" in current column 812*d* and current row 816*b*. Thus, operation proceeds to step 1212 from step 1208. In step 1212, a next column—column 812*e*—is determined to be present in decision table 800. Thus, operation proceeds to step 1214 from step 1212. In step 1214, column 812*e* is the next column after the current column 812*d*, and thus is set to the new current column. Operation proceeds to step 1216. In step 1216, "true" is the required fact value present in current column 812*e* and current row 812*e*, and thus a fact value is required. Operation therefore proceeds to step 1218. In step 1218, the next fact value determined is the fact value corresponding to column 812*e*. Fact resolver module 702*e* may correspond to column 812*e*, and may be invoked by resolver interface 412 to determine the fact value corresponding to column 812*e*. For instance, the fact value corresponding to column 812*e* may be determined to be "false." Operation proceeds back to step 1208.

In step 1208, the determined fact value of "false" does not match the required fact value of "true" in current column 812*e* and current row 816*b*. Thus, operation proceeds to step 1210 from step 1208. In step 1210, the next row of decision table 800 after current row 816*b*—row 816*c*—is set to be the current row. Operation proceeds back to step 1208.

In step 1208, the determined fact value of "false" does match the required fact value of "false" in current column 812*e* and current row 816*c*. Thus, operation proceeds to step 1212 from step 1208. In step 1212, a next column is determined to not be present in decision table 800 after column 816*e*. Thus, operation proceeds from step 1212 to step 908 of flowchart 900, and flowchart 1200 is complete. In this example, because operation of flowchart 1200 is complete when the current row is row 816*c*, row 816*c* is the matched row of step 906. The determined data values of "true" for column 812*a*, "true" for column 812*b*, "false" for column 812*d*, and "false" for column 812*e* match the required data values in row 816*c*. Matched row 816*c* corresponds to a branch of decision tree 600 shown in FIG. 6, from decision node 602*a* to conclusion 606*c*. Conclusion 606*c* is indicated in decision table 800 as the conclusion for row 816*c*.

In step 908, the decision is set to a conclusion corresponding to the matched row. In an embodiment, inference engine 410 sets the decision to the conclusion of the matched row of the decision table. In the current example, the matched row is row 816*c*. As shown in FIG. 8, conclusion 606*c* is the conclusion of row 816*c*. Thus, in the current example, inference engine 410 sets the decision to conclusion 606*c*.

In step 912, the decision is transmitted to the requesting application. As shown in FIG. 4, inference engine 410 provides a decision response signal 432 to runtime interface 406 that includes the decision of step 908. Runtime interface 406 transmits decision response signal 432 to application 104.

It is noted that in some cases, a row of decision table 800 may not be matched. For instance, such a case may occur when an attempt to determine a fact value in step 1206 and/or step 1218 of flowchart 1200 fails, such that a null or unknown value is returned rather than a fact value such as "true" or "false." In such a case, a row of decision table 418 may not be matched. Thus, an "unknown" conclusion may be produced by flowchart 1200, rather a particular conclusion corresponding to a row of decision table 418. In such a case, inference engine 410 may return an "unknown" conclusion to application 104, and/or may perform additional iterations of the decision making process to make a decision. New data may be provided for each iteration until a final conclusion is reached, if needed.

Furthermore, in embodiments, inference engine 410 may perform nested decision making processes. For example, nested decision making processes may be formed by generating nested decision trees using configuration interface 402, which in turn may generate nested decision tables. In a nested decision making process, a first decision tree/table may reference a second decision tree/table, etc.

Inference engine 410 may be implemented in hardware, software, firmware, or any combination thereof. For example, in an embodiment, inference engine 410 may be implemented as computer code that is executed by one or more processors in one or more computer systems. Storage 404 may be implemented as any type of storage medium or mechanism, including real and virtual storage. For example, storage 404 may include one or more memory devices (e.g., RAM and/or ROM devices), hard disc drives (e.g., magnetic drives), optical disc drives, or further types of storage, or any combination thereof.

Client Assembly Generator

Figure 13:
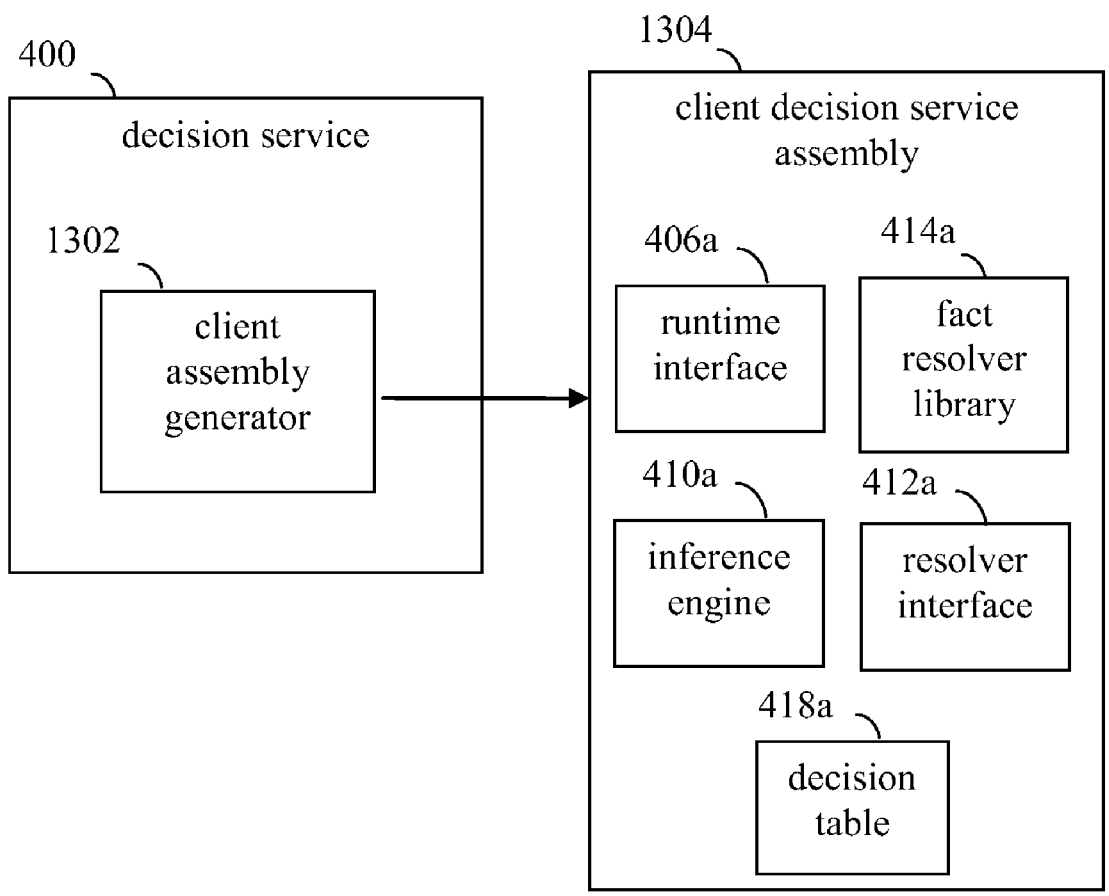
FIG. 13 shows a block diagram of a decision service configured to generate a client decision service assembly, according to an example embodiment.

FIG. 13 shows a block diagram of decision service 400, according to an example embodiment. In FIG. 13, decision service 400 includes a client assembly generator 1302. Client assembly generator 1302 is configured to generate a client decision service assembly 1304. Client decision service assembly 1304 is a stand-alone decision service that is configured to perform the decision making process of decision service 400, as described above. Client decision service assembly 1304 is configured to operate locally to application 104. Thus, in an embodiment, network access may not be required for application 104 and client decision service assembly 1304 to communicate. For example, client decision service assembly 1304 may operate on a same computer system with application 104, in a similar fashion to the configuration shown in FIG. 3.

As shown in FIG. 13, in an embodiment, client assembly generator 1302 may generate client decision service assembly 1304 to include copies of portions of decision service 400 shown in FIG. 4, including a runtime interface 406*a*, an inference engine 410*a*, a resolver interface 412*a*, a fact resolver library 414*a*, and a decision table 418*a*.

Client assembly generator 1302 may be implemented in hardware, software, firmware, or any combination thereof. For example, in an embodiment, client assembly generator 1302 may be implemented as computer code that is executed by one or more processors in one or more computer systems.

In an embodiment, client assembly generator 1302 may be configured to generate client decision service assembly 1304 as a .NET Assembly to be included as a component of application 104. Such an implementation enables client decision service assembly 1304 to be used locally, reducing network communications, and eliminating a need to communicate with a central database.

Example Computer System

Figure 14:
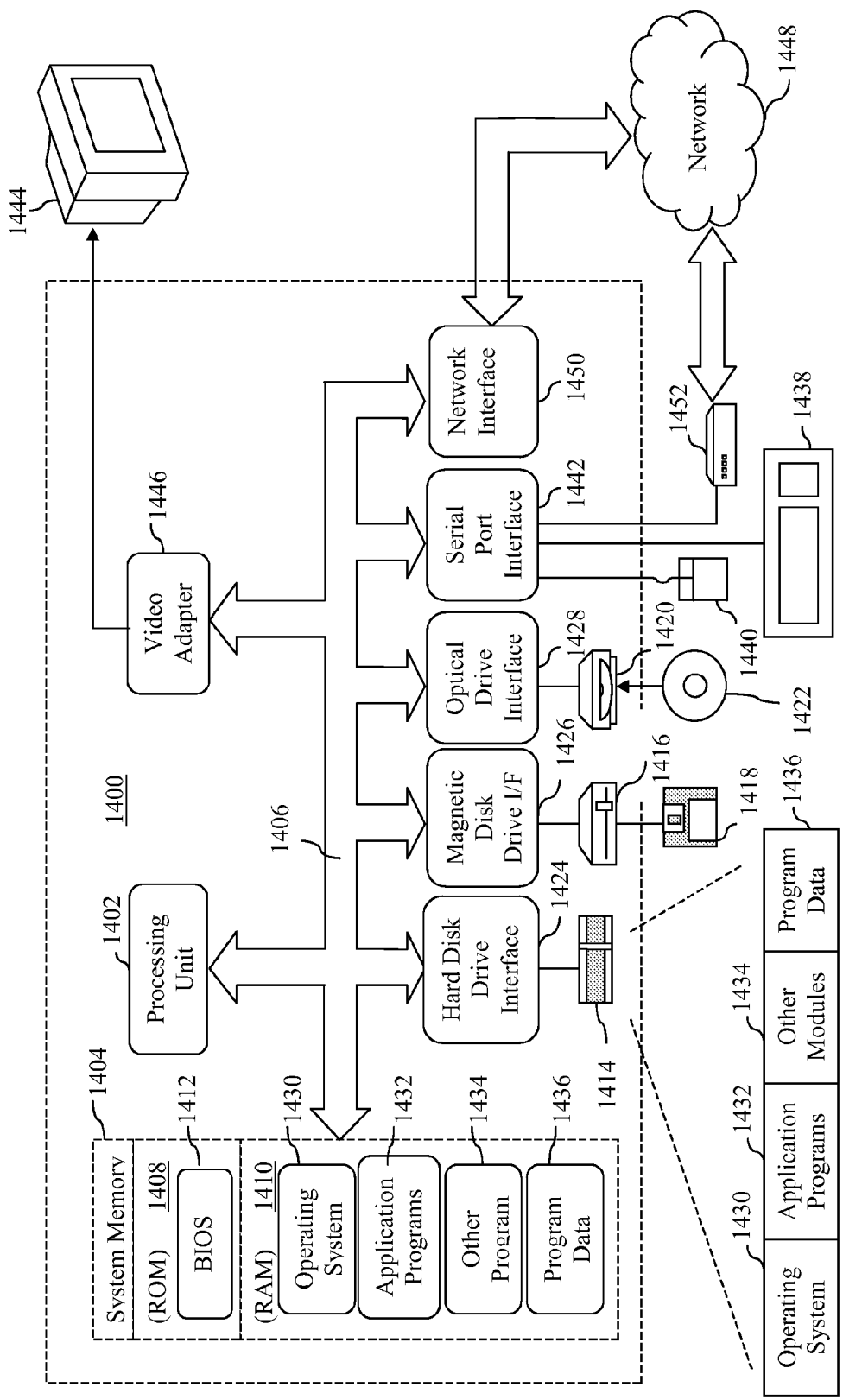
FIG. 14 shows a block diagram of an example computer that may be used to implement embodiments of the present invention.

FIG. 14 depicts an exemplary implementation of a computer 1400 in which embodiments of the present invention may be implemented. For example, decision service 102 may be implemented on computer 1400. Computer systems 202 and 206 shown in FIG. 2 and computer system 302 shown in FIG. 3 may be implemented similarly to computer 1400. Computer 1400 may be a general-purpose computing device in the form of a conventional personal computer, a mobile computer, or a workstation, for example. The description of computer 1400 provided herein is provided for purposes of illustration, and is not intended to be limiting. Embodiments of the present invention may be implemented in further types of computer systems, as would be known to persons skilled in the relevant art(s).

As shown in FIG. 14, computer 1400 includes a processing unit 1402, a system memory 1404, and a bus 1406 that couples various system components including system memory 1404 to processing unit 1402. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random access memory (RAM) 1410. A basic input/output system 1412 (BIOS) is stored in ROM 1408.

Computer 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, or other optical media. Hard disk drive 1414, magnetic disk drive 1416, and optical disk drive 1420 are connected to bus 1406 by a hard disk drive interface 1424, a magnetic disk drive interface 1426, and an optical drive interface 1428, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1430, one or more application programs 1432, other program modules 1434, and program data 1436. Application programs 1432 or program modules 1434 may include, for example, logic for implementing decision service 102 (e.g., decision service 400), as described above.

A user may enter commands and information into the computer 1400 through input devices such as keyboard 1438 and pointing device 1440. Other input devices (not shown) may include a microphone, joystick, game pad, satellite dish, scanner, or the like. These and other input devices are often connected to the processing unit 1402 through a serial port interface 1442 that is coupled to bus 1406, but may be connected by other interfaces, such as a parallel port, game port, or a universal serial bus (USB).

A monitor 1444 or other type of display device is also connected to bus 1406 via an interface, such as a video adapter 1446. Monitor 1444 is used to present a graphical user interface that assists a user/operator in interacting with add-in development tool 1302 or application 904, for example. In addition to the monitor, computer 1400 may include other peripheral output devices (not shown) such as speakers and printers.

Computer 1400 is connected to a network 1448 (e.g., the Internet) through a network interface or adapter 1450, a modem 1452, or other means for establishing communications over the network. Modem 1452, which may be internal or external, is connected to bus 1406 via serial port interface 1442.

As used herein, the terms "computer program medium" and "computer-readable medium" are used to generally refer to media such as the hard disk associated with hard disk drive 1414, removable magnetic disk 1418, removable optical disk 1422, as well as other media such as flash memory cards, digital video disks, random access memories (RAMs), read only memories (ROM), and the like.

As noted above, computer programs and modules (including application programs 1432 and other program modules 1434) may be stored on the hard disk, magnetic disk, optical disk, ROM, or RAM. Such computer programs may also be received via network interface 1450 or serial port interface 1442. Such computer programs, when executed or loaded by an application, enable computer 1400 to implement features of embodiments of the present invention discussed herein. Accordingly, such computer programs represent controllers of the computer 1400.

The invention is also directed to computer program products comprising software stored on any computer usable medium. Such software, when executed in one or more data processing devices, causes a data processing device(s) to operate as described herein. Embodiments of the present invention employ any computer-usable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. For example, the description of fact value data arranged in a decision table in "columns" and "rows" is provided for illustrative purposes. Persons skilled in the relevant art(s) will understand that "columns" and "rows" of a table may be interchanged, and thus the terms "columns" and "rows" as referenced in the appended claims are intended to cover all possible orientations of the fact values in a decision table.

Accordingly, the breadth and scope of the present invention should not be limited by any of the above-described exemplary embodiments, but should be defined only in accordance with the following claims and their equivalents

What is claimed is:

1. A method for making a decision, comprising:
   (a) receiving a request from an application for a decision;
   (b) setting a first row of a decision table to a current row, the decision table having a plurality of rows and columns, each column listing required fact values for a corresponding fact of a plurality of facts and each row having a corresponding conclusion;
   (c) setting a first column of the decision table to a current column;
   (d) determining a fact value corresponding to the current column;
   (e) determining whether the determined fact value matches the required fact value in the current column and current row of the decision table;
   (f) if the determined fact value does not match the required fact value in the current column and current row, setting a next row of the decision table to the current row while maintaining a same current column and returning to (e);
   (g) if the determined fact value does match the required fact value in the current column and current row, determining whether a next column is present in the decision table;
   (h) if a next column is not present in the decision table, proceeding to (m);
   (i) setting the next column of the decision table to the current column;
   (j) determining whether a fact value is required for the current column;
   (k) if a fact value is not required for the current column, determining whether a next column is present in the decision table and returning to (h);
   (l) if a fact value is required for the current column, returning to (d);
   (m) selecting the conclusion corresponding to the current row; and
   (n) transmitting the conclusion to the requesting application as the decision.

2. The method of claim 1, wherein said determining a fact value corresponding to the current column comprises:
   transmitting a request to a resolver interface to resolve the fact value corresponding to the current column;
   receiving the resolved fact value from the resolver interface; and
   storing the received resolved fact value as a determined fact value.

3. The method of claim 2, wherein the resolver interface invokes a fact resolver module of a plurality of fact resolver modules to resolve the fact value.

4. The method of claim 3, further comprising:
   enabling a user to configure a decision tree having a plurality of nodes and branches;
   enabling the user to provide the plurality of fact resolver modules; and
   generating the decision table from the decision tree such that each column of the decision table corresponds to a node of the plurality of nodes.

5. The method of claim 1, further comprising:
   receiving from the application one or more values for variables used in said determining a fact value corresponding to the current column.

6. The method of claim 1, wherein said receiving a request from an application for a decision comprises:
   receiving the request over a network from a computer system that executes the application.

7. A decision service, comprising:
   a runtime interface configured to receive a request from an application to generate a decision;
   a resolver interface configured to invoke a plurality of fact resolver modules, each of the plurality of fact resolver modules being configured to determine a corresponding fact value; and
   an inference engine, at least partially implemented by a processor, configured to determine a plurality of fact values, to communicate with the resolver interface to determine at least one fact value of the plurality of fact values, and to compare the determined plurality of fact values to one or more rows of a decision table to determine a matched row, the decision table having a plurality of rows and columns, each column of the decision table listing required fact values for a corresponding fact of a plurality of facts and each row of the decision table having a corresponding conclusion;
   the inference engine being configured to set the decision to the conclusion corresponding with the matched row;
   the inference engine being configured to set a first row of the decision table to a current row, to set a first column of the decision table to a current column, and to determine whether a first determined fact value matches a required fact value in the current column and current row of the decision table;
   if the determined fact value does not match the required fact value in the current column and current row of the decision table, the inference engine is configured to set a next row of the decision table to the current row while maintaining a same current column and to repeat the determination of whether the first determined fact value matches the required fact value in the current column and current row of the decision table until a match is found; and
   the runtime interface being configured to transmit the decision to the requesting application.

8. The decision service of claim 7, further comprising:
   a configuration interface configured to enable a user to configure a decision tree having a plurality of nodes and branches, to enable the user to provide a plurality of fact resolver modules configured to resolve the plurality of fact values, and to generate the decision table from the decision tree such that each column of the decision table corresponds to a node of the plurality of nodes.

9. The decision service of claim 7,
   if the determined fact value does match the required fact value in the current column and current row, the inference engine is configured to determine whether a next column is present in the decision table;
   if a next column is not present in the decision table, the inference engine is configured to set the decision to the conclusion corresponding with the matched row;
   if a next column is present in the decision table, the inference engine is configured to set the next column of the decision table to the current column, and to determine whether a fact value is required for the current column;
   if a fact value is not required for the current column, the inference engine is configured to repeat determining whether a next column is present in the decision table; and
   if a fact value is required for the current column, the inference engine is configured to determine a next fact value of the plurality of fact values, and to repeat determining whether the determined fact value matches a required fact value in the current column and current row of the decision table.

10. The decision service of claim 7, wherein the runtime interface is configured to receive the request from the application over a network from a computer system that executes the application.

11. The decision service of claim 7, further comprising:
a storage configured to store the plurality of fact resolver modules and the decision table.

12. The decision service of claim 7, further comprising:
a client assembly generator configured to generate a client assembly that includes a copy of the inference engine, of the resolver interface, of the runtime interface, of the decision table, and of the fact resolver modules.

13. A method for a decision service, comprising:
receiving a request from an application to generate a decision;
determining a plurality of fact values in response to the request, said determining comprising
  transmitting a request to a resolver interface to resolve a fact value of the plurality of fact values,
  receiving the resolved fact value from the resolver interface,
  storing the received resolved fact value as a determined fact value, and
  comparing the determined plurality of fact values to one or more rows of a decision table to determine a matched row;
setting the decision to a conclusion corresponding to the matched row of the decision table; and
transmitting the decision to the requesting application;
said determining further comprising:
  (a) determining a fact value corresponding to the current column; and
said comparing comprising:
  (b) setting a first row of the decision table to a current row,
  (c) setting a first column of the decision table to a current column,
  (d) determining whether the determined fact value matches the required fact value in the current column and current row of the decision table,
  (e) if the determined fact value does not match the required fact value in the current column and current row, setting a next row of the decision table to the current row while maintaining a same current column and returning to (d),
  (f) if the determined fact value does match the required fact value in the current column and current row, determining whether a next column is present in the decision table,
  (g) if a next column is not present in the decision table, proceeding to (l),
  (h) setting the next column of the decision table to the current column,
  (i) determining whether a fact value is required for the current column,
  (j) if a fact value is required for the current column, repeating (a) and returning to (d),
  (k) if a fact value is not required for the current column, determining whether a next column is present in the decision table and returning to (g),
  (l) selecting the conclusion corresponding to the current row, and
  (m) transmitting the conclusion to the requesting application as the decision.

14. The method of claim 13, wherein said determining a plurality of fact values in response to the request further comprises:
repeating said transmitting the request, said receiving the resolved fact value, and said storing the received resolved fact value for at least one additional fact value of the plurality of fact values.

15. The method of claim 13, further comprising:
enabling a user to configure a decision tree having a plurality of nodes and branches;
enabling the user to provide a plurality of fact resolver modules configured to resolve the plurality of fact values; and
generating the decision table from the decision tree such that each column of the decision table corresponds to a node of the plurality of nodes.

16. The method of claim 13, further comprising:
receiving one or more values for variables used in said determining from the application.

17. The method of claim 13, wherein said receiving a request from an application for a decision comprises:
receiving the request over a network from a computer system that executes the application.

* * * * *